US010467120B2

(12) United States Patent
Schuermans et al.

(10) Patent No.: US 10,467,120 B2
(45) Date of Patent: Nov. 5, 2019

(54) SOFTWARE OPTIMIZATION FOR MULTICORE SYSTEMS (71) Applicant: Silexica GmbH, Köln (DE)

(72) Inventors: Stefan Schuermans, Aachen (DE); Benjamin Goldschmidt, Aachen (DE); Maximilian Odendahl, Cologne (DE)

(73) Assignee: Silexica GmbH, Köln (DE)

( * ) Notice: Subject to any disclaimer, the term of this patent is extended or adjusted under 35 U.S.C. 154(b) by 309 days.

(21) Appl. No.: 15/349,305

(22) Filed: Nov. 11, 2016

(65) Prior Publication Data

US 2018/0139306 A1 May 17, 2018

(51) Int. Cl.
| G06F 11/30 | (2006.01) |
| G06F 11/34 | (2006.01) |
| H04L 29/08 | (2006.01) |
| G06F 8/41 | (2018.01) |

(52) U.S. Cl.
CPC .......... *G06F 11/3457* (2013.01); *G06F 8/443* (2013.01); *G06F 8/445* (2013.01); *G06F 8/45* (2013.01); *G06F 11/30* (2013.01); *G06F 11/3404* (2013.01); *H04L 67/34* (2013.01); *H04L 67/1002* (2013.01)

(58) Field of Classification Search
CPC .......... H04L 67/00; H04L 67/10–1025; H04L 67/1029; H04L 67/32; H04L 67/34; H04L 43/00; H04L 43/50; G06F 11/00; G06F 11/30; G06F 11/34–3409; G06F 11/3442–3466
See application file for complete search history.

(56) References Cited

U.S. PATENT DOCUMENTS

| 5,838,919 A | * | 11/1998 | Schwaller | ............... H04L 43/50 709/224 |
| 6,317,775 B1 | * | 11/2001 | Coile | ................... H01R 31/005 709/201 |
| 6,925,431 B1 | * | 8/2005 | Papaefstathiou | ... G06F 17/5022 703/17 |
| 6,996,517 B1 | * | 2/2006 | Papaefstathiou | ......... G06F 8/51 702/186 |

(Continued)

OTHER PUBLICATIONS

"Automatic Parallelization Tool," Wikipedia, Oct. 13, 2016, 7 pages, [Online] [Retrieved on Oct. 19, 2017] Retrieved from the Internet<URL:https://en.wikipedia.org/w/index.php?title=Automatic_parallelization_tool&oldid=744209622>.

*Primary Examiner* — Michael A Keller
*Assistant Examiner* — Boris D Grijalva Lobos
(74) *Attorney, Agent, or Firm* — Fenwick & West LLP (57) ABSTRACT A computer-implemented method and non-transitory computer readable medium for software optimization. The method comprises accessing program code having a plurality of software tasks and generating a first mapping of the software tasks to a plurality of processors of a target system having a plurality of physical communication links. A simulation of the target system is executed according to the first mapping. During the simulation, the software tasks cause data transfers over simulated communication links corresponding to the physical communication links. The data transfers are modeled in phases during the simulation and data rates of the simulated physical links are distributed across corresponding active data transfers. A second mapping of the software tasks to the plurality of processors is generated based on a result of the simulation.

20 Claims, 7 Drawing Sheets

(56) References Cited

U.S. PATENT DOCUMENTS

| | | | | |
|---|---|---|---|---|
| 7,490,031 | B1* | 2/2009 | Qiu | G06F 8/38 |
| | | | | 703/22 |
| 7,664,249 | B2* | 2/2010 | Horvitz | H04L 41/147 |
| | | | | 370/254 |
| 7,844,432 | B1* | 11/2010 | Jones | H04L 43/50 |
| | | | | 370/395.53 |
| 8,027,827 | B2* | 9/2011 | Bitar | G06F 11/3409 |
| | | | | 703/21 |
| 8,321,871 | B1* | 11/2012 | Jackson | G06F 9/5027 |
| | | | | 718/104 |
| 8,413,155 | B2* | 4/2013 | Jackson | G06F 9/505 |
| | | | | 718/104 |
| 9,766,996 | B1* | 9/2017 | Cao | G06F 11/3447 |
| 2002/0133325 | A1* | 9/2002 | Hoare, II | G06F 17/5009 |
| | | | | 703/17 |
| 2002/0198694 | A1* | 12/2002 | Yang | G06F 17/5009 |
| | | | | 703/6 |
| 2003/0139917 | A1* | 7/2003 | Hardwick | G06F 11/3414 |
| | | | | 703/21 |
| 2004/0146065 | A1* | 7/2004 | Li | H04L 43/10 |
| | | | | 370/449 |
| 2005/0018784 | A1* | 1/2005 | Kurobe | H04L 1/0003 |
| | | | | 375/260 |
| 2005/0027504 | A1* | 2/2005 | Watanabe | G06F 11/3457 |
| | | | | 703/22 |
| 2007/0094002 | A1* | 4/2007 | Berstis | G06F 9/5072 |
| | | | | 703/22 |
| 2008/0155537 | A1* | 6/2008 | Dinda | G06F 9/4887 |
| | | | | 718/1 |
| 2008/0250227 | A1* | 10/2008 | Linderman | G06F 15/167 |
| | | | | 712/32 |
| 2008/0304516 | A1* | 12/2008 | Feng | G06F 9/5038 |
| | | | | 370/468 |
| 2010/0036641 | A1* | 2/2010 | Lee | G06F 11/3419 |
| | | | | 702/186 |
| 2012/0311570 | A1* | 12/2012 | Gandhi | G06F 9/5027 |
| | | | | 718/1 |
| 2014/0099101 | A1* | 4/2014 | Elhage | H04L 41/145 |
| | | | | 398/25 |
| 2016/0373196 | A1* | 12/2016 | Stott | H04B 17/336 |
| 2017/0249568 | A1* | 8/2017 | White, II | G06Q 10/067 |
| 2018/0048551 | A1* | 2/2018 | Lee | G06F 9/45558 |

* cited by examiner

FIG. 1

- 3 buses
  - A: Max data rate 100 B/s
  - B: Max data rate 50 B/s
  - C: Max data rate 100 B/s
- 3 bus communications
  - R: via A and C, 200 byes
  - S: via C and B, 200 bytes
  - T: via B and A, 150 bytes

|  |  | used d/r | | | DT data rate on link | | | | | | DT data rate | | |
|---|---|---|---|---|---|---|---|---|---|---|---|---|---|
|  |  | A | B | C | A.R | A.T | B.S | B.T | C.R | C.S | R | S | T |
|  | initialization | 0 | 0 | 0 | 0 | 0 | 0 | 0 | 0 | 0 | 0 | 0 | 0 |
|  | iteration 1 | | | | | | | | | | | | |
| 602 | distribute available data rate to DTs | 100 | 50 | 100 | 50 | 50 | 25 | 25 | 50 | 50 | | | |
| 604 | determine data rate of DTs from data rate of links used | | | | | | | | | | 50 | 25 | 25 |
| 606 | update used data rate of links | 75 | 50 | 75 | 50 | 25 | 25 | 25 | 50 | 25 | | | |
|  | iteration 2 | | | | | | | | | | | | |
| 612 | distribute available data rate to DTs | 100 | 50 | 100 | 62 | 37 | 25 | 25 | 62 | 37 | | | |
| 614 | determine data rate of DTs from data rate of links used | | | | | | | | | | 62 | 25 | 25 |
| 616 | update used data rate of links | 87 | 50 | 87 | 62 | 25 | 25 | 25 | 62 | 25 | | | |
|  | iteration 3 | | | | | | | | | | | | |
| 622 | distribute available data rate to DTs | 100 | 50 | 100 | 68 | 33 | 25 | 25 | 68 | 33 | | | |
| 624 | determine data rate of DTs from data rate of links used | | | | | | | | | | 68 | 25 | 25 |
| 626 | update used data rate of links | 93 | 50 | 93 | 68 | 25 | 25 | 25 | 68 | 25 | | | |
|  | iteration 4 | | | | | | | | | | | | |
| 632 | distribute available data rate to DTs | 100 | 50 | 100 | 71 | 28 | 25 | 25 | 71 | 28 | | | |
| 634 | determine data rate of DTs from data rate of links used | | | | | | | | | | 71 | 25 | 25 |
| 636 | update used data rate of links | 96 | 50 | 96 | 71 | 25 | 25 | 25 | 71 | 25 | | | |

SOFTWARE OPTIMIZATION FOR MULTICORE SYSTEMS

BACKGROUND

Most modern computing systems include several processing cores. However, optimizing software for a multi-core system is a difficult task. Without the proper assignment of software tasks to processor cores, the software may not execute on multiple cores in an efficient manner. The severity of this problem further increases as the number of processing cores increases.

SUMMARY

In one embodiment, a computer-implemented method of software optimization is disclosed. The method comprises accessing parallelized program code having a plurality of software tasks and generating a first mapping of the software tasks to a plurality of processors of a target system having a plurality of physical communication links. The method also comprises executing a simulation of the target system according to the first mapping, the software tasks causing data transfers over simulated communication links corresponding to the physical communication links. During the simulation, the data transfers are modeled in phases and corresponding durations of the phases are determined. At least a phase of the phases comprises: identifying, from the data transfers, active data transfers that are concurrent with each other, distributing data rates of the simulated communication links across corresponding active data transfers to determine data rates of the active data transfers, and determining a corresponding duration of the phase based on the data rates of the active data transfers. A second mapping of the software tasks to the plurality of processors is generated based on a result of the simulation that is affected by the corresponding durations of the phases. In one embodiment, the parallelized source code is compiled into compiled code based on the second mapping.

In one embodiment, at least two of the active data transfers share a simulated communication link of the simulated communication links. Additionally, the data rates of the simulated communication links is distributed by (a) distributing available data rate of the simulated physical link to the at least two active data transfers; (b) determining data rates of the active data transfers based on the available data rate distributed to the at least two active data transfers and available data rate of one or more other simulated communication physical links that are distributed to the at least two active data transfers; and (c) after determining the data rates, updating the available data rate of the simulated physical communication link based on the data rates of the at least two active data transfers. Steps (a)-(c) can be repeated for one or more iterations until the data rates stabilize.

In one embodiment, a non-transitory computer readable medium stores instructions that are executed by a processor to implement the method.

BRIEF DESCRIPTION OF THE DRAWINGS

The teachings of the embodiments disclosed herein can be readily understood by considering the following detailed description in conjunction with the accompanying drawings.

DETAILED DESCRIPTION

Reference will now be made in detail to several embodiments, examples of which are illustrated in the accompanying figures. It is noted that wherever practicable similar or like reference numbers may be used in the figures and may indicate similar or like functionality. The figures and accompanying description depict various embodiments for purposes of illustration only. One skilled in the art will readily recognize from the following description that alternative embodiments of the structures and methods illustrated herein may be employed without departing from the principles described herein.

Figure 1:
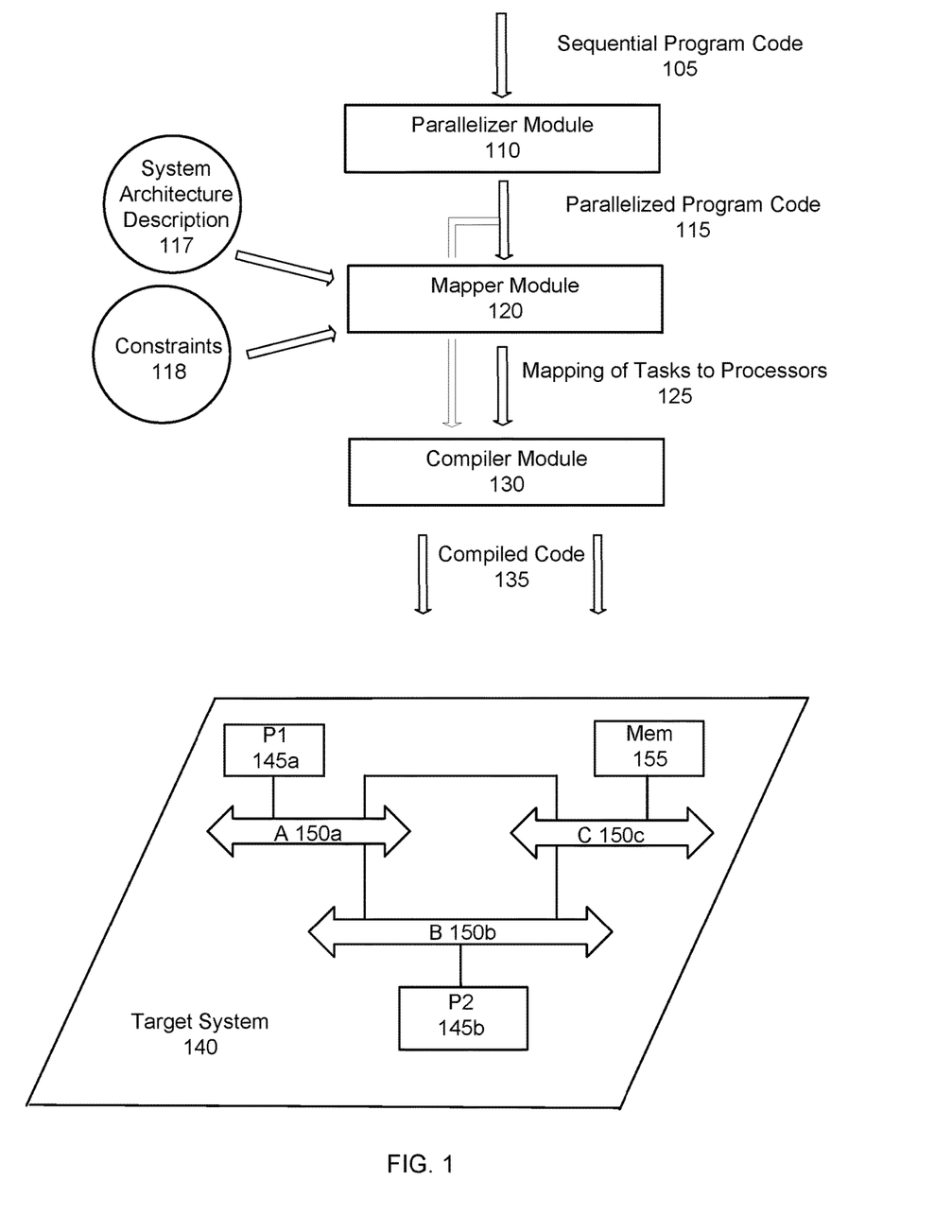
FIG. 1 illustrates a flow for multi-core software compilation, according to an embodiment of the present disclosure.

FIG. 1 illustrates a flow for multi-core software compilation, according to an embodiment of the present disclosure. Shown are a parallelizer module 110, a mapper module 120, a compiler module 130, and a multi-core target system 140. In one embodiment, the modules are implemented with software instructions that are executed on a host system.

The target system 140 represents a target computing system that a software program will be compiled for. The target system 140 includes several physical processors 145 and a memory 155. The processors 145 can include central processing unit (CPU) cores that execute processor instructions for an instruction set of the processor core 145. The processors 145 can also include digital signal processing (DSP) cores that execute specialized instructions, graphical processor unit (GPU) cores or other specialized accelerator cores. Further, the processors 145 may be multi-core processors that each have multiple (similar or different) processor cores internally. The processors 145 communicate data with each other and the memory 155 over physical communication links 150 during the execution of software tasks. Physical communication links 150 are communications paths between internal hardware components of a computing system and carry data between the components. For example, processor P1 145a communicates with processor P2 145b over link A 150a and link B 150b. Processor P1 145a communicates with memory 202 over link A 150a and link C 150c. Processor P2 145b communicates with memory 202 over link B 150b and link C 150c. Examples of physical communication links can be communication paths within a crossbar switch, buses, point-to-point connections and router to router connections in a network on chip.

The parallelizer module 110 receives sequential program code 105 as an input and converts the sequential program code 105 into a parallelized program code 115. In one embodiment, the parallelizer module 110 uses static and dynamic code analysis techniques to detect typical parallelism patterns in the sequential program code 105. Example of these patterns are Task-Level Parallelism (TLP), Data-Level Parallelism (DLP), and Pipeline-Level Parallelism (PLP). The parallelizer module 110 then displays information to a code designer indicating which code lines should be moved to a different task. The parallelizer module 110 then receives a user input splitting the sequential source code 105 into parallelized program code 115. For example, a user may use a text editor of the parallelizer module 110 to move code lines to a different software task.

The parallelized program code 115 can include several separate software tasks. A software task is portion of executable code performing a well-defined function. It may use a certain amount of data storage internally. Further, it may receive inputs from other software tasks and/or provide outputs to other software tasks. The software tasks can collectively be viewed as an interconnected web of software components that communicate with each other to perform their respective functions. In one embodiment, a software task is a process or thread.

In one embodiment, the sequential program code 105 is source code in the C programming language. In one embodiment, the parallelized program code 115 is parallelized source code described in Kahn Process Network (KPN) format. The software tasks in this embodiment can be processes in the KPN, where each software task is a single process. However, other formats for sequential program code 105 and parallelized program code 115 are also possible.

The mapper module 120 receives as input the parallelized program code 115, a system architecture description 117, and mapping constraints 118. The system architecture description 117 describes the hardware architecture of the target system 140 that the parallelized program code 115 will be compiled onto and executed on. For example, the system architecture description 117 can describe how many processors 145 are in the target system 140, the type of processors 145, how much memory is in the target system 140, the physical communication links 150 in the target system 140, the maximum data rate of the links 150, and how the various components in the target system 140 are connected to each other. In one embodiment, the system architecture description 117 can be a target system model.

The constraints 118 describe restrictions on how the software tasks are to be mapped to the processors 145. For example, a constraint 118 can require certain software tasks to be assigned to certain processor cores 145. A constraint 118 may also require a data buffer to be mapped to a certain memory, which may implicitly impose restrictions onto the processors that can execute the tasks accessing this buffer. Further, a constraint 118 may specify an upper limit for the execution time of one task, the entire application or a certain part of it.

The mapper module 120 uses heuristics and performance estimations to automatically generate a mapping of software tasks to processors 145. The mapping describes which software tasks are assigned to which processors 145. In one embodiment, the mapping is in the form of a table that includes a list of software tasks, and next to each software task, a specific processor that the software task is assigned to.

The performance of the mapping can be affected by congestion, which occurs when multiple software tasks are communicating across a shared physical communication link 150 of the target system 140. In one embodiment, to evaluate this congestion, the mapper module 120 simulates the target system 140 according to the mapping of software tasks to processor cores and models communication in phases during the simulation. During each phase the effect of congestion is taken into account by distributing the data rate of a simulated communication link to the logical data transfers across that simulated communication link. The distribution of data rate can use an iterative algorithm that distributes the available data rate of a simulated communication link to the logical data transfers, determines data rates of the data transfers, updates the available data rate, and repeats this process for multiple iterations until the data rates of the data transfers stabilize. The result is a more accurate modeling of logical data transfers and execution times of the software tasks. The result of the simulation can be used to improve the mapping of the software tasks to the processors 145. The improved mapping 125 is then output to the compiler module 130.

The compiler module 130 receives the final mapping 125 of software tasks to processor cores and compiles the parallelized program code 115 into compiled code 135 according to the mapping 125. The compiled code 135 includes instructions in the instruction set of the processors 145. The compiled code 135 is then executed directly on the processors 145 of the target system 140. In one embodiment, the compilation is a two step process. First, source to source translation is used to convert the target-independent parallelized program code 115 into multiple sequential, target-specific C codes. In each sequential target C code, appropriate functions calls to the communication libraries of the target processor are inserted. Further, a main function is generated for each processor core, which contains the code to set up the communication channels used by this processor core and to start the software tasks mapped to this processor. Second, the translated program code is then compiled into the final compiled code 135. In one embodiment, this compilation can be achieved using the native target compilers for each processor core.

In one embodiment, as a result of the flow in FIG. 1, and more specifically the improved mapping generated by the mapper module 120, the software program can execute on the multi-core target system 140 in a shorter amount of time. As a result, the speed of the target system 140 in executing the software program is improved, and resources of the target system 140 are freed up to execute other software programs.

Figure 2:
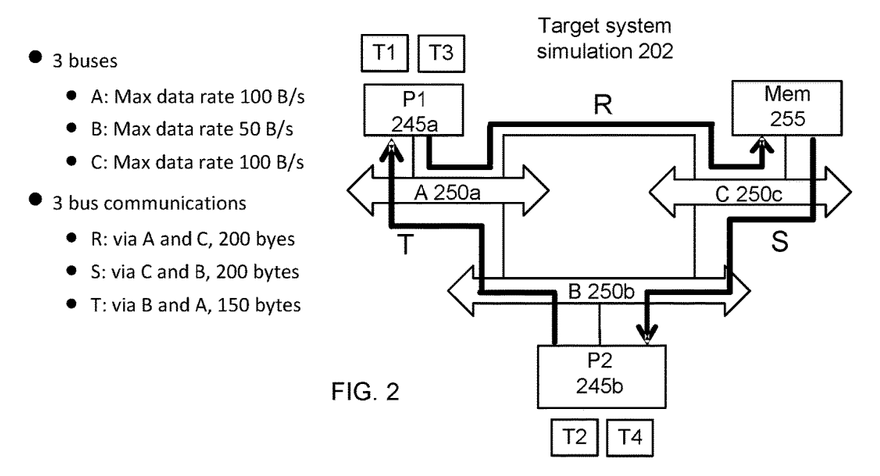
FIG. 2 is a diagram illustrating communications during a target system simulation 202, according to an embodiment of the present disclosure.

FIG. 2 is a diagram illustrating communications during a target system simulation 202, according to an embodiment. The simulation 202 can be performed by the mapper module 120 after it generates a mapping of software tasks to processor cores. During the simulation 202, execution of the software tasks is simulated and data transfers of those software tasks can be modeled.

The target system simulation 202 includes simulated processors P1 245a and P2 245b that correspond to processors P1 145a and P2 145b. The target system simulation 202 also includes a simulated memory 255 that corresponds to memory 155. The target system simulation 202 also includes simulated communication links A 250a, B 250b and C 250c that correspond to physical communication links A 150a, B 150b and C 150c.

In FIG. 2, software tasks T1 and T3 are mapped to simulated processor P1. Software tasks T2 and T4 are mapped to simulated processor core P2. During simulation 202, a software task may cause logical data transfers between two simulated components of the target system simulation 202 across one or more simulated communication links 250. For example, a logical data transfer can involve writing data to or reading data from other software tasks executing on other simulated processors 245, writing data to or reading data from the simulated memory 155, or exchanging data with other simulated hardware components over the simulated communication links 250. In one embodiment, a logical data transfer involves sending a message of a certain size from a processor 245 to another processor 245, from a processor 245 to a memory 250 or from a memory 250 to a processor 245.

There are three logical data transfers shown in FIG. 2: R, S, T. Data transfer R can be initiated by software task T1. Data transfer S can be initiated by software task T2. Data transfer T can be initiated by software task T4.

Data transfer R is between simulated processor P1 and simulated memory 255 over simulated links A and C. Data transfer R has 200 bytes of data to transfer. Data transfer S is between simulated processor P2 and simulated memory 255 over simulated links B and C. Data transfer S has 200 bytes of data to transfer. Data transfer T is between simulated processor P1 and P2 over simulated links A and B. Data transfer T has 150 bytes of data to transfer.

Simulated link A has a maximum data rate of 100 B/s (bytes per second). Simulated link B has a maximum data rate of 50 B/s. Simulated link C has a maximum data rate of 100 B/s. In a real target system 140, if multiple data transfers are occurring at the same time across the same physical links, there will be link contention amongst the data transfers that causes the data transfers to take longer to complete. In one embodiment, this link contention is modeled during simulation 202 so that the effect of link contention on data transfer time is accurately reflected in the simulation results. Modeling of link contention will be explained by reference to later figures.

Figure 3:
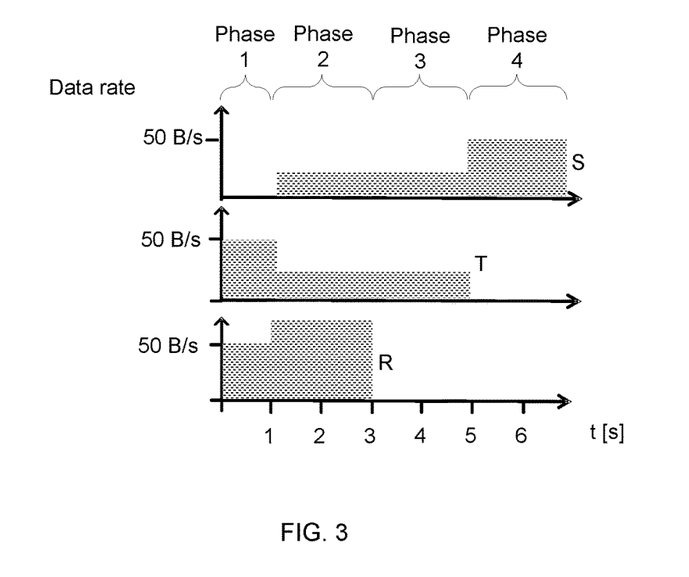
FIG. 3 is a diagram illustrating distribution of available data rate of a physical communication link to logical data transfers during simulation, according to an embodiment of the present disclosure.

FIG. 3 is a diagram illustrating distribution of link data rate to data transfers during simulation, according to an embodiment. There are three graphs in FIG. 3, one for the data rate distributed to data transfer S, one for the data rate distributed to data transfer T, and another for data rate distributed to data transfer R. The X axis represents for simulation time, and the Y axis represents data rate.

To model the effect of link contention on performance, link traffic and contention is modeled in sequential phases. A simulation phase can be a period of time during which the active data transfers are static and not changing—i.e. no new data transfers are being initiated and no existing data transfers are completed. Each simulation phase begins when there is a change to the set of active data transfers, which can occur when any active data transfer completes transferring its data, or a new active data transfer begins. Each simulation phase ends when there is a subsequent change to the set of active data transfers, which can similarly occur when any active data transfer completes transferring its data or a new active data transfer begins. A data transfer is considered to be active during a phase if it is transferring data during the phase.

For example, in FIG. 3 there are four simulation phases. Phase 1 is between 0-1 seconds. Data transfers R and T are active during phase 1. Phase 2 is between 2-4 seconds. Data transfers R, T and S are active during phase 2. Phase 3 is between 3-5 seconds. Data transfers T and S are active during phase 3. Phase 4 is between 5-7 seconds. Data transfer S is active during phase 4.

During each phase the available data rate of the simulated links is distributed across the data transfers that are active in that phase. In phase 1, the data rate of simulated bus A is split amongst data transfers T and R such that each data transfer has a 50 B/s data rate. In phase 2, the data rate of the simulated links is redistributed amongst the active data transfers in that phase. As a result, data transfer S has a 25 B/s data rate, data transfer T has a 25 B/s data rate, and data transfer R has a 75 B/s data rate. Similarly, in phases 3 and 4, the data rate of the simulated links is again redistributed across their respective active data transfers. Furthermore, in each phase the available data rate is distributed using an iterative algorithm that repeatedly distributes the available link data rate and adjusts the data rates of the data transfers until the data rates stabilize, which results in a more accurate estimation of how the data rates are distributed across the links.

Figure 4:
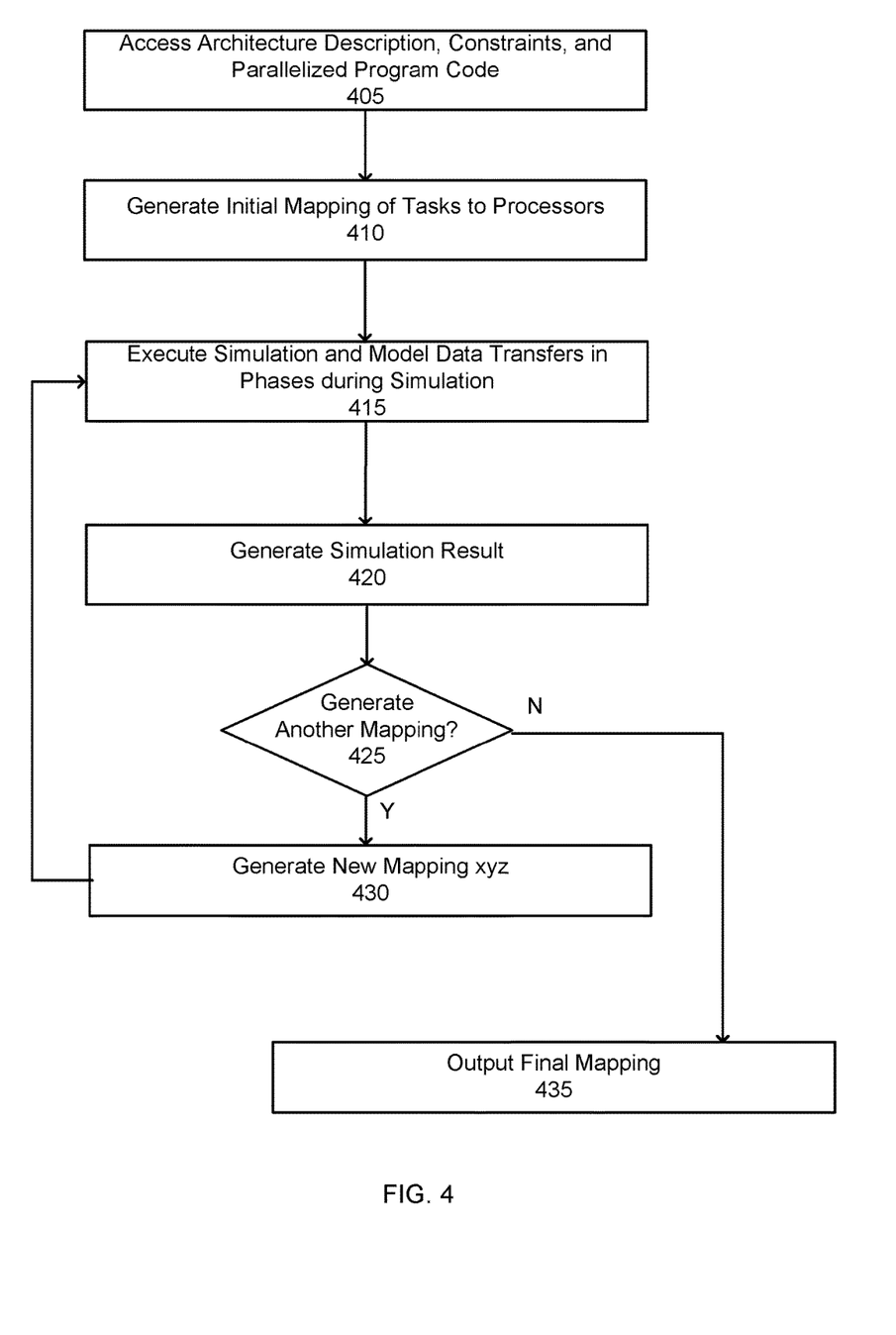
FIG. 4 is a flowchart illustrating a method for mapping software tasks to processors, according to an embodiment of the present disclosure.

FIG. 4 is a flowchart illustrating a method for mapping software tasks to processors, according to an embodiment. In one embodiment, the method of FIG. 4 can be performed by the mapper module 120.

In step 405, the mapper module 120 accesses a system architecture description 117 of the target system, accesses a set of constraints 118, and accesses the parallelized program code 115 that includes multiple software tasks.

In step 410, the mapper module 120 generates an initial mapping of software tasks to processors 145. The initial mapping can be performed using a set of pre-determined mapping heuristics that attempt to predict the optimal mapping of software tasks to processors 145. The mapping heuristics can use the information in the architecture description 117 and take into account the constraints 118 when generating the mapping.

In step 415, the mapper module 120 executes a simulation of the target system 140, which includes simulating how the software tasks execute on the processors of the target system. During the simulation, data transfers are modeled in communication phases and durations of the communication phases are determined. An example of communication phases was previously described in FIG. 3. The details of the simulation and modeling of the data transfers in step 415 will be later explained by reference to FIG. 5.

In step 420, the mapper module 120 generates a simulation result upon completion of the simulation. The simulation result can be generated from the phase durations determined during the data transfer modelling of step 415. In one embodiment, the simulation result is in the form of communication costs and a software task execution schedule.

The communication costs can describe the durations of the logical data transfers over the simulated communication links. Communication costs thus represent the expected durations of data transfers in a real target system, which are influenced by the amount of contention on the physical links on a real target system. The communication costs can be generated from the phase durations previously identified in step 415 and the active data transfers during each phase.

Figure 7:
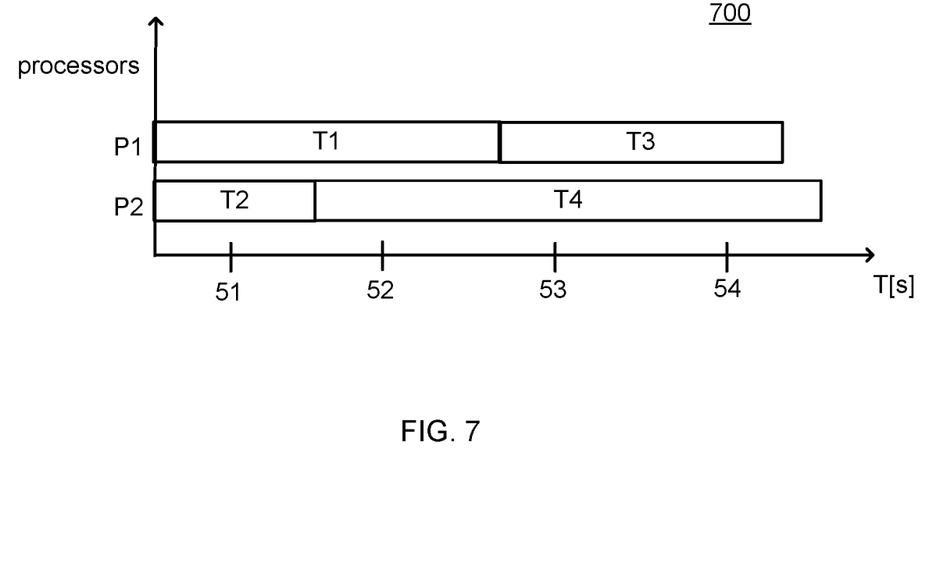
FIG. 7 is a software task schedule, according to an embodiment of the present disclosure.

The software task execution schedule can include information about which processors the software tasks are mapped to and information about the execution timing (e.g. begin time and end time) of each software task. For example, referring briefly to FIG. 7, shown is a software task execution schedule 700 according to an embodiment. The software task execution schedule 700 shows that tasks T1 and T3 execute on processor P1 at different times between time 50 s to after time 54 s, and that task T2 and T4 execute on processor P2 at different times between time 50 s to after time 54 s. The software task execution schedule also shows when the tasks execute on their respective processors, and how long the tasks execute for. FIG. 7 is just one example of the format of a software task schedule 700, and in other embodiments, the software task schedule 700 can have a different appearance. The software task execution schedule 700 is also affected by the computed phase durations.

Referring back to FIG. 4, in step 425, the mapper module 120 determines whether another mapping should be generated. For example, another mapping may be generated if the simulation result indicates that the current mapping does not result in a sufficient level of software performance. If it is determined that another mapping is to be generated, in step 430, a new mapping of software tasks to processor cores is generated. Steps 415, 420, and 425 are then repeated to re-simulate the target system using the new mapping and to generate another simulation result.

In one embodiment, to make the determination 425 of whether to generate another mapping, the mapper module 120 can display information corresponding to the simulation result to a user. For example, the displayed information can be the raw data of or graphs generated from the software task execution schedule and/or the communication costs. The user can evaluate the displayed information to determine if the existing mapping meets performance goals. If the existing mapping does not meet performance goals, the mapper module 120 receives a user input requesting that another mapping be generated. The user input can also include additional constraints to be used when generating the new mapping. In step 430, upon receiving this user input, a new mapping of software tasks to processor cores is generated from these new constraints.

In another embodiment, generating 430 the mapping can include automatically using the simulation result to generate another mapping that is expected to be better than the previous mapping. For example, the mapping heuristics of the mapping module 120 can take the communication costs as an input. The mapping heuristics then modify the mapping in an attempt to reduce communication costs that exceed a threshold. The simulation 415 is then performed again with the new mapping.

The process of generating 430 new mappings, simulating 415 the software tasks, and generating 420 a simulation result can repeat one or more times until the simulation result indicates that the mapping results in a sufficient level of performance. Once this occurs, in step 435, the mapper module 120 outputs the final mapping 125 of software tasks to processor cores. Referring briefly to FIG. 1, this final mapping 125 is provided to the compiler module 130 and used to generate compiled code 135. The compiled code is then executed on a physical target system 140.

Figure 5:
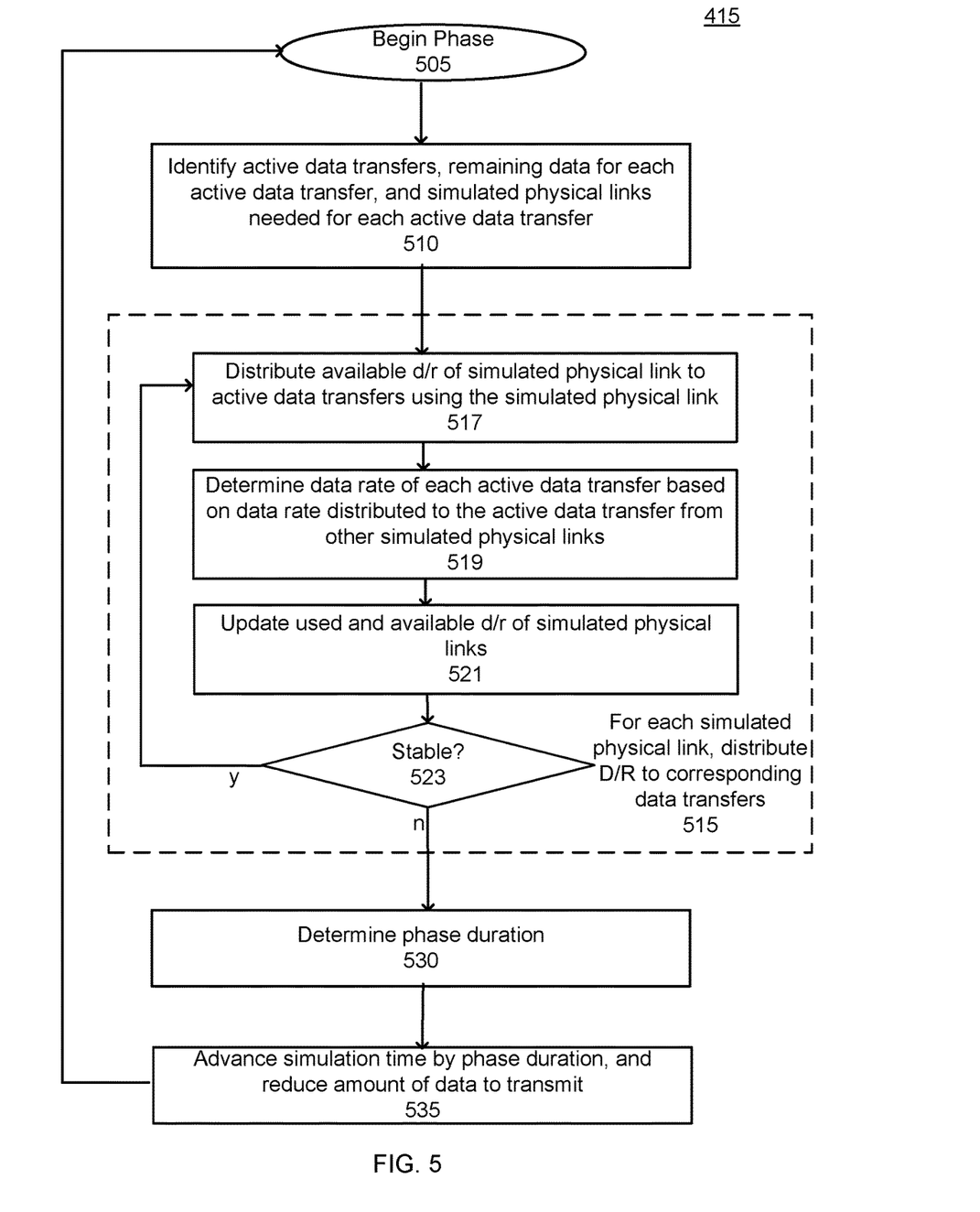
FIG. 5 is a flowchart illustrating the details of modeling communication in phases during simulation of software tasks, and corresponds to step 415 of FIG. 4, according to an embodiment of the present disclosure.

Referring now to FIG. 5, illustrated are the details of modeling communication in phases during simulation, and corresponds to step 415 of FIG. 4. In step 505, a phase begins at a particular simulation time. In step 510, the mapper module 120 identifies active data transfers that are concurrently transferring data at the beginning of the phase. For each active data transfer, the mapper module 120 also identifies remaining data that is to be transmitted during the active data transfer, and simulated links that are used by the active data transfers to transfer data. Some of the active data transfers may share the same simulated links when transferring data during the simulation.

In step 515, the mapper module 120, for each simulated communication link, distributes the data rate of the simulated communication link to the data transfers transferring data over that simulated link. Distributing the data rate of the simulated communication link results in individual data rates being assigned to each of the data transfers. Step 515 includes several sub-steps 517, 519, 521, and 523 that can repeat for multiple iterations until the data rates stabilize. Once the data rates stabilize, it indicates that correct data rates for the data transfers have been reached.

In step 530, the phase duration is determined using the data rates from step 515. The phase duration can be determined in multiple steps. First, for each active data transfer, the remaining duration of the active data transfer is determined. The remaining duration is computed by dividing the remaining data (e.g. 200 bytes) to be transmitted by the data transfer by the data rate (e.g. 50 B/s) of the active data transfer. Second, the remaining durations are then compared with each other to identify the minimum duration of all the remaining durations. Third, the duration of time until the start of the next active data transfer is determined. The phase duration is then set to be the minimum of the active data transfers and the duration of time until the start of the next active data transfer.

For example, referring back to FIG. 3, suppose the phase duration of phase 1 is being determined at the simulation time of t=0 s. A remaining duration of data transfer T is calculated to be 3 seconds (150 bytes divided by 50 B/s) and the duration of R would be calculated to be 4 seconds (200 bytes divided by 50 B/s). It is noted that the calculated times are different than that shown in FIG. 3, which is because the calculations are based on data rates determined at time t=0 s, and it is not yet known that the data rates will later change at time=1 s. Data transfer S starts after 1 second. Therefore the phase duration of phase 1 is set to 1 second, which is the minimum of the determined 3, 4, and 1 second durations.

Similarly, suppose the phase duration of phase 2 is being determined at the simulation time of t=1 s. A remaining duration of data transfer S is calculated to be 8 seconds (200 bytes remaining divided by 25 B/s). A remaining duration of data transfer T is calculated to be 4 seconds (100 bytes remaining divided by 25 B/s). A remaining duration of R is calculated to be 2 seconds (150 bytes divided by 75 B/s). It is noted that the calculated times may be different than that shown in FIG. 3, which is because the calculations are based on data rates determined at time t=1 s, and it is not yet known that the data rates will later change at time=5 s. Therefore the phase duration of phase 2 is set to 2 seconds, which is the minimum of the determined 8, 4, and 2 second durations.

Referring back to FIG. 5, in step 535 the simulation time is advanced by the phase duration. Also, for each active data transfer, the remaining data that is to be transmitted by that active data transfer is reduced by the data transferred during the phase. The process then returns to 505 to begin the next phase. The same process occurs for each phase until the phase durations for all phases is determined.

The sub-steps within step 515 for distributing link data rate to the active data transfers during a single phase is now explained in greater detail. The sub-steps within step 515 will also be explained in conjunction with the example in FIG. 6 to help illustrate application of the sub-steps.

In step 517, the available data rate of a simulated link is determined and distributed to active data transfers that share and use that simulated link. In the first iteration of step 517 it is assumed that all data rate of a simulated link is unused and available. The distribution of data rate results in data rates being assigned to the active data transfers. In one embodiment, the available data rate of a simulated link is distributed equally amongst the data transfers that share the simulated link.

Figure 6:
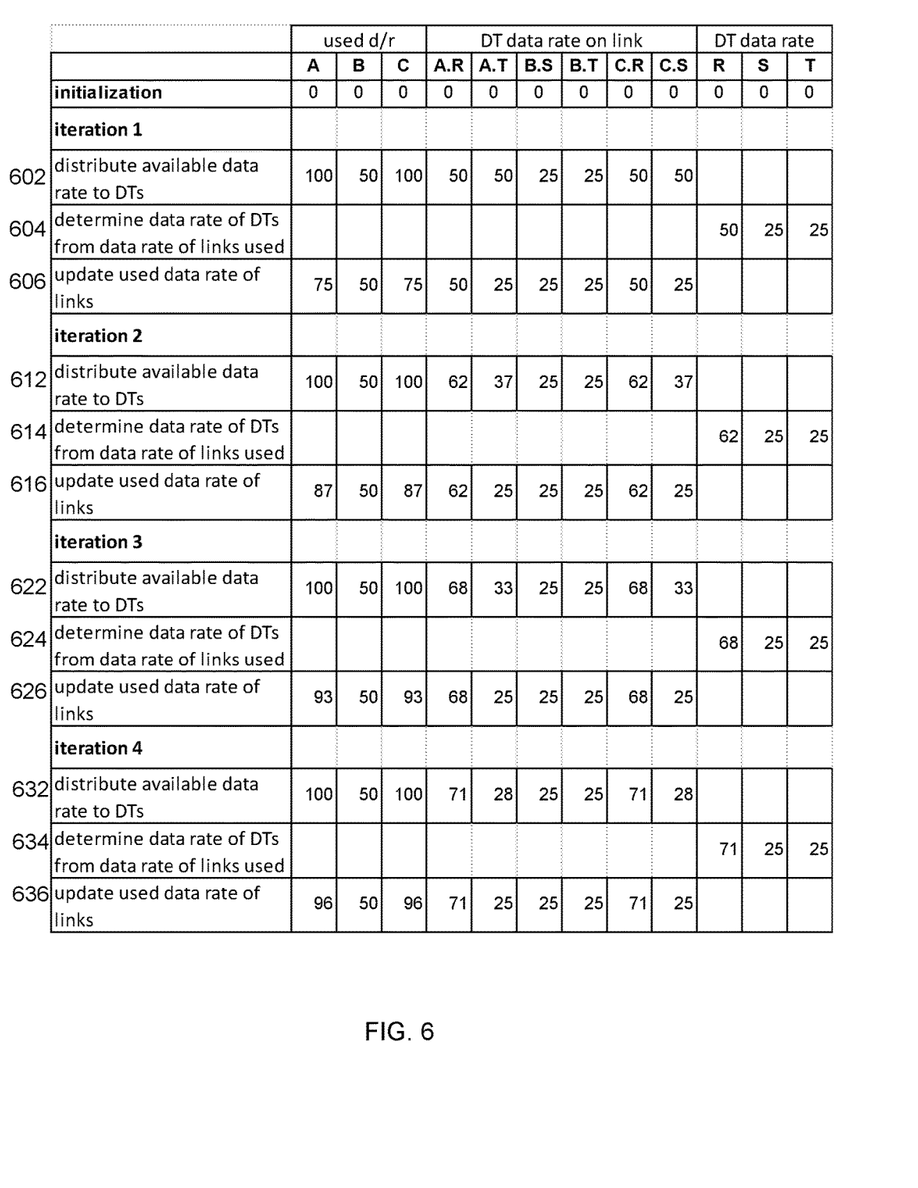
FIG. 6 is a chart showing a specific example of how data rate is iteratively distributed to the logical data transfers of FIG. 2, according to an embodiment of the present disclosure.

Distribution of available data rate in step 517 can be understood by reference to the example of FIG. 6. Referring now to FIG. 6, illustrated is a chart showing a specific example of how data rate is iteratively distributed to the data transfers of FIG. 2. The columns labeled A, B, and C represent the used data rate of simulated link A, B and C. The column A.R is the data rate assigned to data transfer R over simulated link A. The column A.T is the data rate assigned to data transfer T over simulated link A. The column B.S is the data rate assigned to data transfer S over simulated link B. The column B.T is the data rate assigned to data transfer T over simulated link B. The column C.R is the data rate assigned to data transfer R over simulated link C. The column C.S is the data rate assigned to data transfer S over simulated link C. The columns R, S, T correspond to the data rates of data transfers R, S and T.

In iteration 1, as shown in line 602, the available data rate of each simulated link is distributed to its corresponding data transfers. This results in all of the available data rate of simulated links A, B and C being used. The 100 B/s data rate of simulated link A is split between data transfers R and T, resulting in 50 B/s being distributed to A.R and 50 B/s being distributed to A.T. The 50 B/s data rate of simulated link B is split between data transfers S and T, resulting in 25 B/s being distributed to B.S and 25 B/s being distributed to B.T. The 100 B/s data rate of simulated link C is split between data transfers R and S, resulting in 50 B/s being distributed to C.R and 50 B/s being distributed to C.S.

Referring again to FIG. 5, in step 519, data rate of each active data transfer is determined based on the data rate distributed to the active data transfer from the simulated link, as well as data rate distributed to the active data transfer from other simulated links used by the active data transfer. Specifically, all the data rates distributed to the data transfers from different simulated links used by the data transfer are compared against each other. The minimum data rate is then selected as the data rate of the active data transfer. The minimum value is selected because when a data transfer extends across multiple serially connected links, it is the link with the minimum data rate that will be a bottleneck on the data rate of the data transfer.

For example, referring again to FIG. 6, in line 604, the data rates of the active data transfers are determined. The data rate for an active data transfer is the minimum of all the data rate distributed to the data transfer from the links used by the data transfer. A.R and C.R are 50 B/s, so the data rate data transfer R is 50 B/s. A.T is 50 B/s and B.T is 25 B/s, so the data rate for data transfer T is the minimum of these two values, 25 B/s. B.S is 25 B/s and C.S is 50 B/s, so the data rate for data transfer S is the minimum of these two values, 25 B/s.

Referring again to FIG. 5, in step 521, the used data rate and available data rate of each simulated link is determined. The used data rate of a simulated link is the sum of the data rates of the data transfers using that simulated link. The available data rate is then computed as the maximum data rate of the simulated link minus the used data rate.

For example, referring again to FIG. 6, in line 606, the used data rate of link A is computed as the sum of the data rate attributed to data transfer R, 50 B/s, and the data rate attributed to data transfer T, 25 B/s. The used data rate of link B is computed as the sum of the data rate attributed to data transfer S, 25 B/s, and the data rate attributed to data transfer T, 25 B/s. The used data rate of bus C is computed as the sum of the data rate attributed to data transfer R, 50 B/s, and the data rate attributed to data transfer S, 25 B/s. Although not shown in FIG. 6, the available data rate of bus A, B and C, respectively, would be computed as 25 B/s, 0 B/s and 25 B/s.

Also, the data rate distributed to A.T is reduced to 25 B/s because data transfer T is bottlenecked by B.T. The data rate distributed to C.S is also reduced to 25 B/s because data transfer S is bottlenecked by B.S.

Referring again to FIG. 5, steps 517, 519 and 521 can be repeated one or more times until it is determined that the data rate of the active data transfers have stabilized. In each iteration, the available data rate is re-determined and redistributed across the links. The data rate available for distribution becomes smaller and smaller in each iteration until it begins to approach zero.

For example, referring to FIG. 6, at the end of iteration 1, there is an available D/R of 25 B/s, 0 B/s, and 25 B/s for links A, B and C respectively. In row 612, this available data rate is distributed to the active data transfers. The 25 B/s available data rate of link A is split between data transfer R and T and added to the data rate already distributed to R and T in iteration 1. As a result, 62 B/s is now distributed to A.R and 37 B/s is distributed to A.T. The 25 B/s available data rate of link C is split between communication R and S and added to the data rate already distributed to R and S in iteration 1. As a result, 62 B/s is now distributed to C.R and 37 B/s is distributed to C.S.

In row 614, the data rate of the data transfers is again determined. Data transfer S still remains at 25 B/s, which is the minimum of B.S and C.S. Data transfer T still remains at 25 B/s, which is the minimum of A.T and B.T. Data transfer R increases to 62 B/s, which is the minimum of A.R and C.R.

In row 616, the used data rates of links A, B and C are computed again. The used data rate of link A is computed to be 87 B/s, which is the sum of the data rate attributed to data transfer R, 62 B/s, and the data rate attributed to data transfer T, 25 B/s. The used data rate of link B is computed to be 50 B/s, which is the sum of the data rate attributed to data transfer S, 25 B/s, and the data rate attributed to data transfer T, 25 B/s. The used data rate of link C is computed to be 87 B/s, which is the sum of the data rate attributed to data transfer R, 62 B/s, and the data rate attributed to data transfer S, 25 B/s. Although not shown in FIG. 6, the available D/R of link A, B and C, respectively, would be computed to be 13 B/s, 0 B/s and 13 B/s.

This process can again be repeated as shown in iterations 3 and 4, shown by rows 622-636. As the number of iterations increases, eventually the changes in the data rates from one iteration to the next begin to shrink or the data rates stop changing. In one embodiment, it is determined if a data rate for a data transfer did not change in the last iteration. If the data rate for the data transfer did not change, then in the next iteration any available bus bandwidth is not distributed to that data transfer. This change improves the overall speed of step 515.

Referring back to FIG. 5, in step 523 it is determined whether the data rates of the active data transfers in the current iteration have stabilized relative to previous iterations. If the data rates have not yet stabilized, steps 517, 519 and 521 are repeated. If the data rates have stabilized, then the determination of data rates is complete and the process proceeds to step 530.

The data rates can be determined to be stable by determining a change parameter indicative of an amount of change from one iteration to the next, and then comparing the change parameter to a change threshold. For example, a percentage change in data rates of the logical data transfers from one iteration to the next can be compared to a change threshold (e.g. 5% change). If the changes are less than the change threshold, the data rates of the active bus communications are deemed to be stable. If the changes are more than a change threshold, the data rates of the active data transfers are deemed to not yet be stable. As another example, percentage changes in the used data rate or available data rate of the links from one iteration to the next can be compared to a change threshold. If the changes in the used data rate or available data rate are less than a change threshold, this is also an indication that the data rates have stabilized. As a further example, a change in data rates (e.g. 2 B/s) from one iteration to the next can be compared to a change threshold (e.g. 1.5 B/s). If the threshold is not exceeded, this is an indication that data rates have stabilized.

In one embodiment as described herein, the improved technique for mapping of software tasks addresses the technical problem of how to make software run efficiently on a multi-core system. Specifically, by more accurately modeling data transfers, the mapping can be refined one or more times to optimize the software for a multi-core system, resulting in software that executes in much less time than non-optimized software.

Example Computer Architecture

Figure 8:
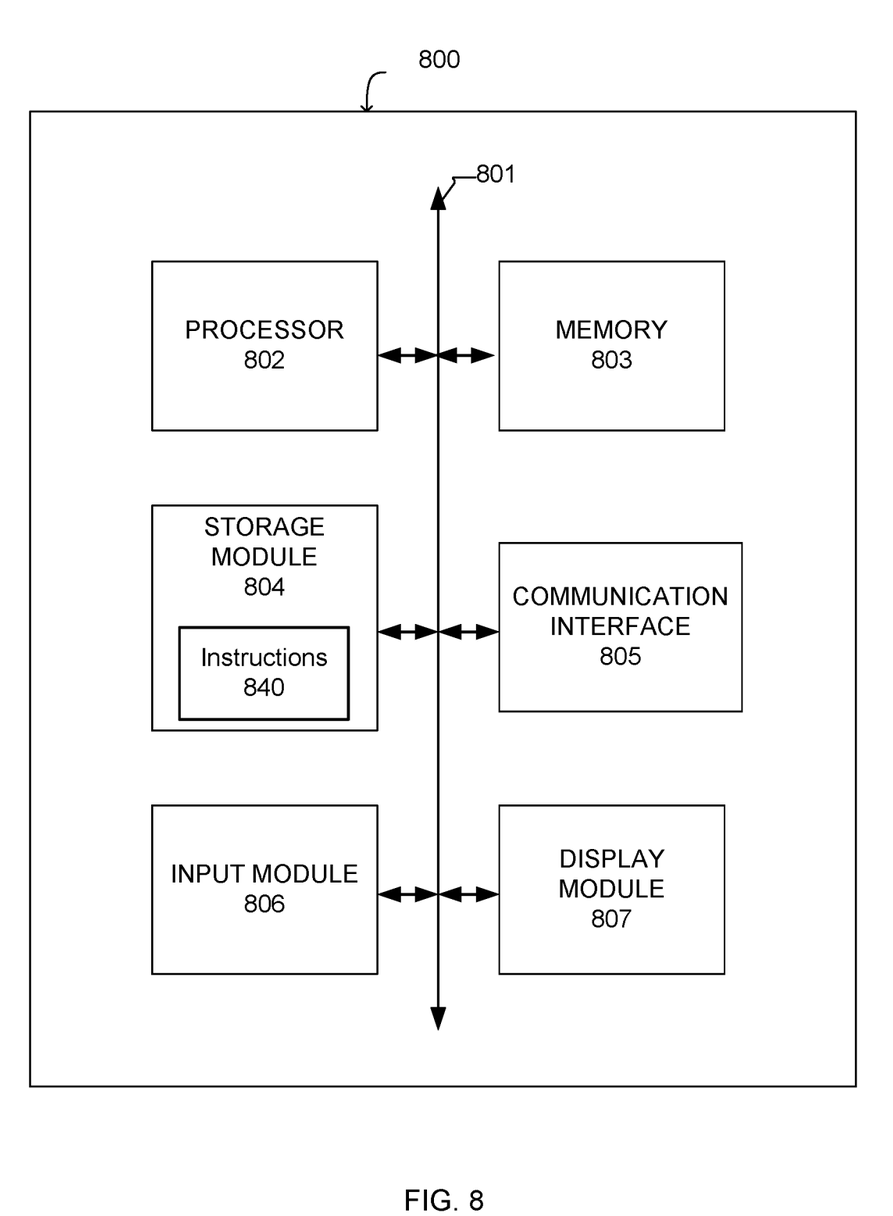
FIG. 8 illustrates the hardware architecture of a computing device, according to an embodiment of the present disclosure.

FIG. 8 illustrates the hardware architecture of a host system 800, according to one embodiment. In one embodiment, the host system 800 is a computer including components such as a processor 802, a memory 803, a storage module 804, an input module (e.g., keyboard, mouse, and the like) 806, a display module 807 and a communication interface 805, exchanging data and control signals with one another through a bus 801. The storage module 804 is implemented as one or more non-transitory computer readable storage media (e.g., hard disk drive), and stores software instructions 840 that are executed by the processor 802 in conjunction with the memory 803 to implement the software modules and simulation described herein. Operating system software and other application software may also be stored in the storage module 804 to run on the processor 602.

Upon reading this disclosure, those of skill in the art will appreciate still additional alternative designs for software optimization for multicore systems. Thus, while particular embodiments and applications of the present disclosure have been illustrated and described, it is to be understood that the embodiments are not limited to the precise construction and components disclosed herein and that various modifications, changes and variations which will be apparent to those skilled in the art may be made in the arrangement, operation and details of the method and apparatus of the present disclosure disclosed herein without departing from the spirit and scope of the disclosure as defined in the appended claims.

What is claimed is:

1. A computer-implemented method of optimizing compilation of parallelizable program code for execution on a multi-core target system, the multi-core target system comprising a plurality of processor cores, the method comprising:
accessing parallelizable program code having a plurality of software tasks;
generating a first mapping of the software tasks to a plurality of processor cores in a multi-core target system having a plurality of physical communication links;
executing a simulation of the target system according to the first mapping, the software tasks causing data transfers over simulated communication links corresponding to the physical communication links during the simulation;
modeling the data transfers in phases during the simulation and determining corresponding durations of the phases, at least one phase of the phases comprising:
identifying, from the data transfers, active data transfers that are concurrent with each other;
distributing data rates of the simulated communication links across corresponding active data transfers to determine data rates of the active data transfers; and
determining a corresponding duration of the phase based on the data rates of the active data transfers;
wherein at least two of the active data transfers share a simulated communication link of the simulated communication links, and distributing the data rates of the simulated communication links comprises:
(a) distributing available data rate of the simulated communication link to the at least two active data transfers;
(b) determining data rates of the at least two active data transfers based on the available data rate distributed to the at least two active data transfers and available data rate of one or more other simulated communication links that are distributed to the at least two active data transfers;
(c) after determining the data rates, updating the available data rate of the simulated communication link based on the data rates of the at least two active data transfers; and
repeating steps (a)-(c) for one or more iterations; and
generating a second mapping of the software tasks to the plurality of processor cores based on a result of the simulation that is affected by the corresponding durations of the phases, the first and second mappings defining different compilations of the parallelizable program code into compiled code for execution on the processor cores of the multi-core target system, wherein the compiled code includes instructions from an instruction set of the processor cores.

2. The method of claim 1, wherein the steps (a)-(c) are repeated for the one or more iterations until changes in the data rates of the active data transfers from one iteration to the next iteration fall below a threshold.

3. The method of claim 1, wherein determining the corresponding duration of the phase based on the data rates of the active data transfers comprises:
determining remaining communication times of the active data transfers based on the data rates of the active data transfers and remaining data to be transmitted by the active data transfers; and
determining the corresponding duration of the phase to be the minimum time of the remaining communication times.

4. The method of claim 1, wherein each phase begins when there is a change in the data transfers that are active and ends when there is a subsequent change in the data transfers that are active.

5. The method of claim 1, wherein the result of the simulation includes at least one of a software task execution schedule describing execution timing of the software tasks or communication costs describing durations of the data transfers, and the second mapping is generated based on the software task execution schedule and/or the communication costs.

6. The method of claim 5, wherein generating the second mapping comprises:
displaying information corresponding to the software task execution schedule and/or the communication costs;
after displaying the information corresponding to the software task execution schedule and/or the communication costs, receiving a user input of one or more constraints; and
generating the second mapping based on the constraints.

7. The method of claim 5, wherein generating the second mapping comprises:
generating, using mapping heuristics, the second mapping of the software tasks based on the communication costs.

8. The computer-implemented method of claim 1, wherein the physical communication links are on-chip communication links.

9. A computer-implemented method of optimizing compilation of parallelizable program code for execution on a multi-core target system, the multi-core target system comprising a plurality of processor cores, the method comprising:
accessing parallelizable program code having a plurality of software tasks;
generating a first mapping of the software tasks to a plurality of processor cores in a multi-core target system having a plurality of physical communication links;
executing a simulation of the target system according to the first mapping, the software tasks causing data transfers over simulated communication links corresponding to the physical communication links during the simulation;
modeling the data transfers in phases during the simulation and determining corresponding durations of the phases, at least one phase of the phases comprising:
identifying, from the data transfers, active data transfers that are concurrent with each other;
distributing data rates of the simulated communication links across corresponding active data transfers to determine data rates of the active data transfers; and
determining a corresponding duration of the phase based on the data rates of the active data transfers;
generating a second mapping of the software tasks to the plurality of processor cores based on a result of the simulation that is affected by the corresponding durations of the phases, the first and second mappings defining different compilations of the parallelizable program code into compiled code for execution on the processor cores of the multi-core target system, wherein the compiled code includes instructions from an instruction set of the processor cores; and
compiling the program code into compiled code based on the second mapping.

10. The method of claim 9, wherein determining the corresponding duration of the phase based on the data rates of the active data transfers comprises:
determining remaining communication times of the active data transfers based on the data rates of the active data transfers and remaining data to be transmitted by the active data transfers; and
determining the corresponding duration of the phase to be the minimum time of the remaining communication times.

11. The method of claim 9, wherein each phase begins when there is a change in the data transfers that are active and ends when there is a subsequent change in the data transfers that are active.

12. The method of claim 9, wherein the result of the simulation includes at least one of a software task execution schedule describing execution timing of the software tasks or communication costs describing durations of the data transfers, and the second mapping is generated based on the software task execution schedule and/or the communication costs.

13. The method of claim 12, wherein generating the second mapping comprises:
displaying information corresponding to the software task execution schedule and/or the communication costs;
after displaying the information corresponding to the software task execution schedule and/or the communication costs, receiving a user input of one or more constraints; and
generating the second mapping based on the constraints.

14. The method of claim 9, wherein the physical communication links are on-chip communication links.

15. A non-transitory computer-readable medium storing instructions for optimizing compilation of parallelizable program code for execution on a multi-core target system, the multi-core target system comprising a plurality of processor cores, the instructions when executed by a processor cause the processor to:
access parallelizable program code having a plurality of software tasks;
generate a first mapping of the software tasks to a plurality of processor cores in a multi-core target system having a plurality of physical communication links;
execute a simulation of the target system according to the first mapping, the software tasks causing data transfers over simulated communication links corresponding to the physical communication links during the simulation;
model the data transfers in phases during the simulation and determining corresponding durations of the phases, at least one phase of the phases comprising:
identifying, from the data transfers, active data transfers that are concurrent with each other;
distributing data rates of the simulated communication links across corresponding active data transfers to determine data rates of the active data transfers; and
determining a corresponding duration of the phase based on the data rates of the active data transfers;
wherein at least two of the active data transfers share a simulated communication link of the simulated communication links, and distributing the data rates of the simulated communication links comprises:
(a) distributing available data rate of the simulated communication link to the at least two active data transfers;
(b) determining data rates of the at least two active data transfers based on the available data rate distributed to the at least two active data transfers and available data rate of one or more other simulated communication links that are distributed to the at least two active data transfers;
(c) after determining the data rates, updating the available data rate of the simulated communication link based on the data rates of the at least two active data transfers; and repeating steps (a)-(c) for one or more iterations; and
generate a second mapping of the software tasks to the plurality of processor cores based on a result of the simulation that is affected by the corresponding durations of the phases, the first and second mappings defining different compilations of the parallelizable program code into compiled code for execution on the processor cores of the multi-core target system, wherein the compiled code includes instructions from an instruction set of the processor cores.

16. The non-transitory computer-readable medium of claim 15, wherein the processor determines the corresponding duration of the phase based on the data rates of the active data transfers by:
   determining remaining communication times of the active data transfers based on the data rates of the active data transfers and remaining data to be transmitted by active data transfers; and
   determining the corresponding duration of the phase to be the minimum time of the remaining communication times.

17. The non-transitory computer-readable medium of claim 15, wherein each phase begins when there is a change in the data transfers that are active and ends when there is a subsequent change in the data transfers that are active.

18. The non-transitory computer-readable medium of claim 15, wherein the result of the simulation includes at least one of a software task execution schedule describing execution timing of the software tasks or communication costs describing durations of the data transfers, and the second mapping is generated based on the software task execution schedule and/or the communication costs.

19. The non-transitory computer-readable medium of claim 18, wherein the processor generates the second mapping by:
   generating, using mapping heuristics, the second mapping of the software tasks based on the communication costs.

20. The non-transitory computer-readable medium of claim 15, wherein the physical communication links are on-chip communication links.

* * * * *